US011657387B2

(12) United States Patent
Delhoste et al.

(10) Patent No.: US 11,657,387 B2
(45) Date of Patent: May 23, 2023

(54) METHOD FOR SECURING A COMPUTER SYSTEM

(71) Applicant: THALES DIS FRANCE SAS, Meudon (FR)

(72) Inventors: Fabrice Delhoste, Gemenos (FR); Frédéric Paillart, Gemenos (FR); Thomas Dandelot, Gemenos (FR); Jean-Philippe Duquesnoy, Gemenos (FR); Camille Dru, Gemenos (FR); Gregory Roubinet, Gemenos (FR)

(73) Assignee: THALES DIS FRANCE SAS, Meudon (FR)

( * ) Notice: Subject to any disclaimer, the term of this patent is extended or adjusted under 35 U.S.C. 154(b) by 22 days.

(21) Appl. No.: 17/048,351

(22) PCT Filed: Apr. 16, 2019

(86) PCT No.: PCT/EP2019/059772
§ 371 (c)(1),
(2) Date: Oct. 16, 2020

(87) PCT Pub. No.: WO2019/201900
PCT Pub. Date: Oct. 24, 2019

(65) Prior Publication Data
US 2021/0374721 A1 Dec. 2, 2021

(30) Foreign Application Priority Data

Apr. 19, 2018 (EP) .................................. 18305485
Aug. 22, 2018 (EP) .................................. 18306129

(51) Int. Cl.
G06Q 20/00 (2012.01)
G06Q 20/36 (2012.01)
(Continued)

(52) U.S. Cl.
CPC ......... *G06Q 20/363* (2013.01); *G06F 21/554* (2013.01); *G06F 21/577* (2013.01); *G06Q 20/382* (2013.01)

(58) Field of Classification Search
USPC .......................................... 705/41
See application file for complete search history.

(56) References Cited

U.S. PATENT DOCUMENTS 9,960,975 B1 * 5/2018 Van Horenbeeck ........................ H04L 63/1416
11,288,666 B1 * 3/2022 Hoffman .............. G06Q 20/327
(Continued)

FOREIGN PATENT DOCUMENTS

WO WO-2014108911 A1 * 7/2014 ............. G06Q 30/08

OTHER PUBLICATIONS

Authors: D.M. Konidala et al: A secure and privacy enhanced protocol for location-based services in ubiquitous society; IEEE Conference Paper; Publication Date: Jan. 1, 2004 Conference Start Date: Nov. 29, 2004 Conference End Date: Dec. 3, 2004 (Year: 2004).*

(Continued)

*Primary Examiner* — Bruce I Ebersman
*Assistant Examiner* — Hatem M Ali

(57) ABSTRACT

The invention is a method for securing a system including a plurality of entities and a repository storing usage patterns. The method comprises the following steps: for each of the entities involved in a transaction requested by a user, capturing a behavior data reflecting the dynamic behavior of said entity, generating a set of locality-sensitive-hashing hashes from each of said behavior data, computing a similarity score for each of the entities involved in the transaction, based on both said usage patterns and the set of generated locality-sensitive-hashing hashes, and based on a (Continued)

subset of the computed similarity scores, applying a preset security action to the transaction.

10 Claims, 3 Drawing Sheets

(51) Int. Cl.
   G06F 21/55   (2013.01)
   G06F 21/57   (2013.01)
   G06Q 20/38   (2012.01)

(56) References Cited

U.S. PATENT DOCUMENTS

| 2012/0005169 A1* | 1/2012 | Saxena | G06F 21/6227 |
| | | | 707/E17.007 |
| 2017/0024561 A1* | 1/2017 | Hajmasan | G06F 21/55 |
| 2020/0351095 A1* | 11/2020 | Yadav | G06F 16/61 |

OTHER PUBLICATIONS

Authors: Ali H. Ahmed et al : Secured Framework for IoT Using Blockchain; Publication Date: Dec. 1, 2019 Electronic Publication Date: Feb. 26, 2020 Conference Start Date: Dec. 8, 2019 Conference End Date: Dec. 10, 2019 (Year: 2019).*

Authors: D.M. Konidala et al: A secure and privacy enhanced protocol for location-based services in ubiquitous society; IEEE Conference Paper: Publication Date: Jan. 1, 2004 Conference Start Date: Nov. 29, 2004 (Year: 2004).*

Authors: Ali H. Ahmed et al : Secured Framework for IoT Using Blockchain; Publication Date: Dec. 1, 2019 Electronic Publication Date: Feb. 26, 2020 Conference Start Date: Dec. 8, 2019 (Year: 2019).*

1. Authors: D.M. Konidala et al: A secure and privacy enhanced protocol for location-based services in ubiquitous society; IEEE Conference Paper: Publication Date: Jan. 1, 2004 (Year: 2004).*

2. Authors: Ali H. Ahmed et al : Secured Framework for IoT Using Blockchain; Publication Date: Dec. 1, 2019 Electronic Publication Date: Feb. 26, 2020; Conference Start Date: Dec. 8, 2019 (Year: 2019) (Year: 2019).*

Bayer, U., et al., "Scalable, Behavior-Based Malware Clustering," 18 pp. (Jul. 18, 2010) Retrieved Feb. 5, 2014 from the Internet: URL:https://web.archive.org/web/20100718062640/http://www.cs.ucsb.edu/-chris/researc h/doc/ndss09 cluster.pdf.

International Search Report and Written Opinion issued in corresponding International Patent Application No. PCT/EP2019/059772, 11 pages (dated May 10, 2019).

Nandi, A., et al., "Anomaly Detection Using Program Control Flow Graph Mining From Execution Logs," Proceedings of the 22nd ACM SIGKDD Int'l Conference on Knowledge Discovery and Data Mining, KDD '16, ACM Press, NY, NY, pp. 215-224 (Aug. 13, 2016).

\* cited by examiner

```
┌─────────────────────────────────────────────────────┐
│ Locally capturing a behavior data reflecting the    │
│ dynamic behavior of each entity involved in a       │──╱ S20
│ transaction requested by a user.                    │
└─────────────────────────────────────────────────────┘
                          │
                          ▼
┌─────────────────────────────────────────────────────┐
│ Generating a LSH hash from each entity involved in  │──╱ S22
│ the transaction.                                    │
└─────────────────────────────────────────────────────┘
                          │
                          ▼
┌─────────────────────────────────────────────────────┐
│ Based on both the repository and the set of generated│──╱ S24
│ LSH hashes, computing a similarity score for each    │
│ entity involved in the transaction.                  │
└─────────────────────────────────────────────────────┘
                          │
                          ▼
┌─────────────────────────────────────────────────────┐
│ Based on a subset of the computed similarity scores,│──╱ S26
│ applying a preset security action to the transaction.│
└─────────────────────────────────────────────────────┘
```

FIG. 2

| Transaction type | Entity | Reference LSH hash(es) |
|---|---|---|
| #01 | 21 | R1 |
| | 22 | R2 |
| | 23 | R3 |
| #02 | 21 | R4, R5 |
| | 24 | R6 |
| | 22 | R7 |
| | 23 | R8, R9, R10 |

(rows for #01 grouped as 50; rows for #02 grouped as 60; table labeled 18)

FIG. 4

METHOD FOR SECURING A COMPUTER SYSTEM

FIELD OF THE INVENTION

The present invention relates to methods for securing computer systems. It relates particularly to methods of securing systems including a plurality of entities.

BACKGROUND OF THE INVENTION

In highly distributed systems, the variety of software components and hardware units makes anti-intrusion detection very complex. For instance two similar transactions may be executed through different services hosted in different servers due to load or availability constraints.

In addition, the need to preserve privacy is increasing more and more, especially when handling data which can be linked to a physical person.

There is a need to provide an enhanced solution to detect malicious attacks against distributed systems while preserving privacy.

SUMMARY OF THE INVENTION

The invention aims at solving the above mentioned technical problem.

An object of the present invention is a system including a plurality of entities. The system is configured to capture for each of said entities involved in a transaction requested by a user a behavior data reflecting the dynamic behavior of said entity. The system is configured to generate a set of locality-sensitive-hashing hashes from each of said behavior data. The system comprises a repository storing usage patterns and is configured to compute a similarity score for each of the entities involved in the transaction, based on both said usage patterns and the set of generated locality-sensitive-hashing hashes. The system, based on a subset of the computed similarity scores, is configured to apply a preset security action to the transaction.

Advantageously, the preset action may be at least one of the group comprising: letting the transaction run, blocking the transaction, deflecting execution of the transaction to legtimate-looking entities, sending an alert signal to a remote system, providing the user with a warning message, or logging a security alert.

Advantageously, the system may comprise a controller agent, each of said entities may be configured to capture its own behavior data and to send its captured behavior data to the controller agent and the controller agent may be configured to compute said similarity scores and to apply the preset security action.

Advantageously, each of said entities may be configured to capture its own behavior data and at least one of said entities may be configured to compute a similarity score and to apply the preset security action.

Advantageously, the behavior data may take into account at least one item of the group comprising: call graph, stack traces generated during execution of the entities, called function, type of input parameters, size of input parameters, value of input parameters, type of output parameters, size of output parameters, value of output parameters and execution duration.

Advantageously, the behavior data may take into account at least one item of the group comprising: communication protocol used for incoming message, communication protocol used for outgoing message, execution time, country where the entity is running.

Advantageously, the entities may be software services, software micro-services or hardware devices.

Advantageously, each of said usage patterns may comprise a transaction type and at least one entry which is allocated to one of said entities and which comprises at least one reference locality-sensitive-hashing hash.

Another object of the invention is a method for securing a system including a plurality of entities. The system also comprises a repository storing usage patterns. The method comprises the following steps:

for each of the entities involved in a transaction requested by a user, capturing a behavior data reflecting the dynamic behavior of said entity, generating a set of locality-sensitive-hashing hashes from each of said behavior data, computing a similarity score for each of the entities involved in the transaction, based on both said usage patterns and the set of generated locality-sensitive-hashing hashes, and based on a subset of the computed similarity scores, applying a preset security action to the transaction.

Advantageously, the preset action may be at least one of the group comprising: letting the transaction run, blocking the transaction, deflecting execution of the transaction to legitimate-looking entities, sending an alert signal to a remote system, providing the user with a warning message, or logging a security alert.

Advantageously, the system may comprise a controller agent, each of said entities may capture its own behavior data and send its captured behavior data to the controller agent and the controller agent may compute said similarity scores and apply the preset security action.

Advantageously, each of the entities involved in the transaction may capture its own behavior data and at least one of said entities may compute a similarity score and apply the preset security action.

Advantageously, the behavior data may take into account at least one item of the group comprising: call graph, stack traces generated during execution of the entities, called function, type of input parameters, size of input parameters, value of input parameters, type of output parameters, size of output parameters, value of output parameters and execution duration.

Advantageously, the behavior data may take into account at least one item of the group comprising: communication protocol used for incoming message, communication protocol used for outgoing message, execution time, country where the entity is running.

Advantageously, the entities may be software services, software micro-services or hardware devices.

BRIEF DESCRIPTION OF THE DRAWINGS

Other characteristics and advantages of the present invention will emerge more clearly from a reading of the following description of a number of preferred embodiments of the invention with reference to the corresponding accompanying drawings in which:

FIG. 2 depicts an example of a flow chart for securing the system according to the invention;

FIG. 4 depicts an example of a repository storing two usage patterns according to the invention.

DETAILED DESCRIPTION OF THE PREFERRED EMBODIMENTS

The invention may apply to any type of system able to interact with a user and comprising at least one computer machine. The user that requests the transaction may be a physical person, a computer device, a software application running on a computer or a system.

Figure 1:
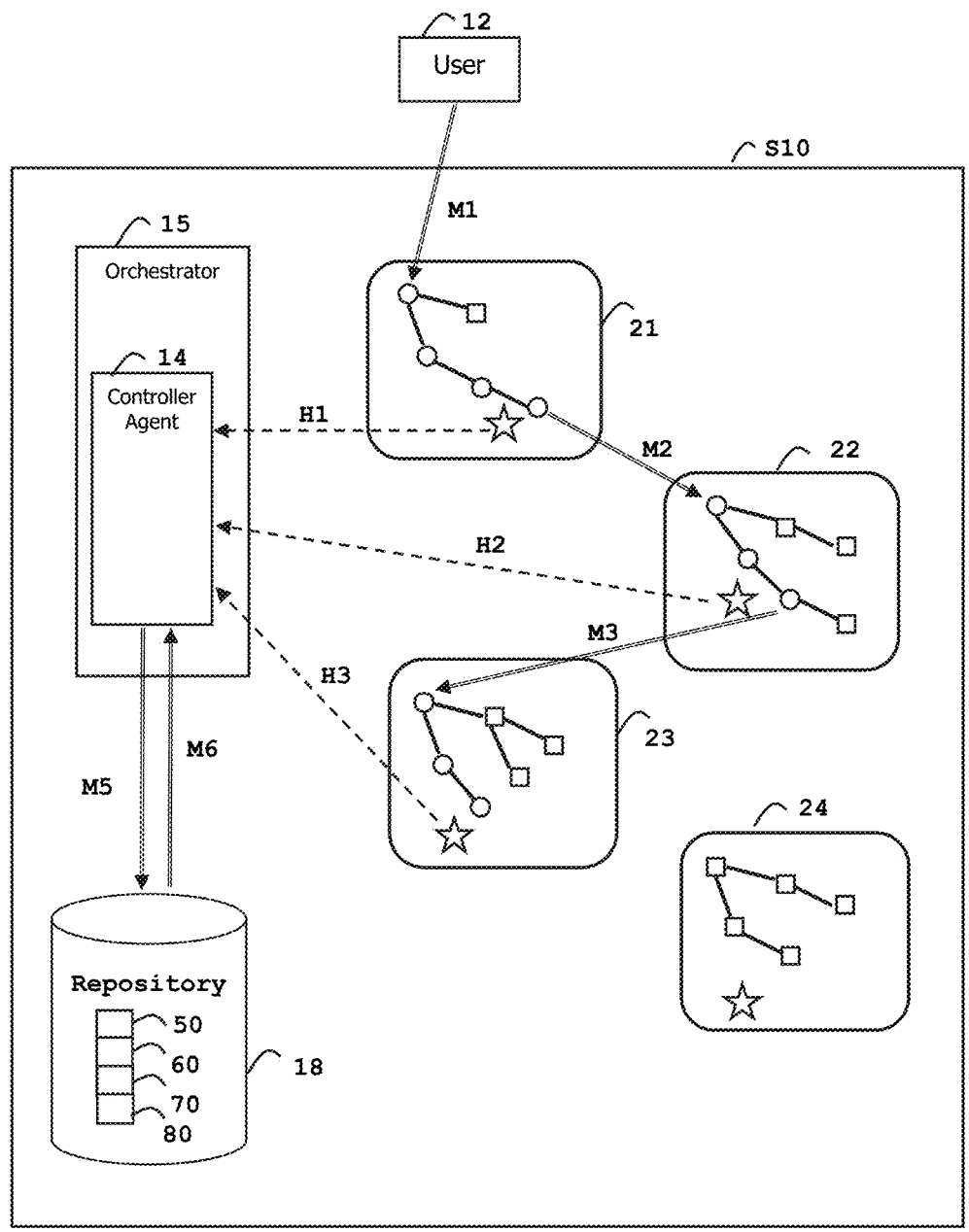
FIG. 1 is first example of architecture of a system according to the invention.

FIG. 1 shows a first example of architecture of a system according to the invention.

In this example, the system 10 comprises a plurality of computer machines (not shown) which host the orchestrator 15, the repository 18 and the entities 21 to 24. The entities (also named components) are software services. Preferably, the repository 18 and the orchestrator 15 are stored in a same computer machine for performance (execution time) reasons. Alternatively, the repository 18 may be hosted in a server computer which can be accessed by the orchestrator 15 through a Telecom network, the Internet or a local network like Wi-Fi or Bluetooth based networks for example.

The orchestrator 15 is responsible for coordinating and organizing execution of entities involved in a transaction.

The repository 18 may be implemented as a database, a file or any relevant container.

The repository 18 stores a series of usage patterns 50, 60, 70, 80 which have been previously provisioned. Each usage pattern comprises a series of reference LSH hashes individually assigned to an entity.

FIG. 4 shows an example of repository 18 comprising two usage patterns 50 and 60.

The usage pattern 50 includes a transaction type #01 and three entries respectively allocated to entities 21, 22 and 23. Each entry comprises a reference LSH hash. The transaction type can be replaced by an identifier of the usage pattern. The first entry comprises a reference LSH hash R1 allocated to the entity 21, the second entry comprises a reference LSH hash R2 allocated to the entity 22 and the third entry comprises the reference LSH hash R3 allocated to the entity 23.

The reference LSH hashes are assumed to have been generated in manner similar to the LSH hashes generated by the tracking agent.

The usage pattern 60 includes a transaction type #02 and four entries respectively allocated to entities 21, 24, 22 and 23. Each entry comprises one or several reference LSH hashes. The first entry of usage pattern 60 comprises two reference LSH hashes R4 and R5 allocated to the entity 21. The second entry comprises a reference LSH hash R6 allocated to the entity 24. The third entry comprises the reference LSH hash R7 allocated to the entity 22 and the fourth entry comprises three reference LSH hashes R8, R9 and R10 allocated to the entity 23.

Advantageously, a usage pattern may also contain additional data like comparison depth, the used algorithm, the version of the used algorithm, configuration parameters of the used algorithm or an entity version.

Preferably, the repository stores several usage patterns corresponding to a large number of transaction types like: purchase of a product or a service, bank transfer, renting a product (like a video or a music), booking a transport ticket, electronic voting, video surveillance, monitoring of a network of sensors, building access management.

Apply to any type of transaction based on a plurality of entities.

In the example of FIG. 1, the orchestrator 15 comprises a controller agent 14 which is designed to receive a locality-sensitive-hashing (LSH) hash from an entity involved in the transaction, to retrieve a reference LSH hash belonging to a usage pattern from the repository and to compute a similarity score associated to the entity involved in the transaction, based on both the retrieved reference LSH hash and the LSH hash. The controller agent 14 is designed to select and apply a preset security action to the transaction based on the computed similarity score.

A list of predefined security actions can be included in the controller agent 14 or stored in another unit like the repository 18.

The security action may be one (or a combination) of the following: letting the transaction run, blocking the transaction, deflecting execution of the transaction to legitimate-looking entities (routing towards a honeypot), sending an alert signal to a remote system, providing the user with a warning message, or logging a security alert.

In another embodiment, the controller agent 14 can be separate from the orchestrator 15. For instance the controller agent 14 and the orchestrator 15 may be hosted in two distinct computer devices.

In the example of FIG. 1, the controller agent 14 is a software component intended to be executed by the processor of the computer hosting the orchestrator. Alternatively, the controller agent 14 may be a hardware unit or a combination of hardware and firmware components.

Locality sensitive hashing (LSH) is a mechanism that can generate a hash (from an item) allowing to assess the similarity between two items. Typically, a LSH implementation provides two functions: one for computing a LSH hash and the other for comparing two LSH hashes. The second function provides a result (also called similarity score) which reflects the degree of similarity between the two items initially used for computing the LSH hashes.

A LSH hash is different from a conventional cryptographic hash. Nevertheless, starting from a LSH hash, it is practically impossible to get the initial item used for computing this LSH hash. Thus privacy of the initial item is preserved when a LSH hash is transmitted.

In this example, the user 12 is a smartphone which requests a bank transfer between accounts using the same currency. The user sends a message M1 to the root service (e.g. first service 21 in this example.) for triggering the transaction. Typically, the message M1 comprises the reference of the type of transaction, the bank account to credit, the amount and the currency.

Advantageously, the message M1 can contain a transaction identifier. The mapping between transaction identifier and transaction type can be stored in the tracking agent, in the controller agent 14 or in the repository 18.

Upon receipt of the message M1, the execution of the first service 21 starts by going through a series of function calls into the service 21. Executed functions are depicted by a circle while unexecuted functions are depicted by a square.

The service 21 includes a tracking agent (depicted by a star) which is adapted to capture behavior data reflecting the dynamic behavior of the service 21. Preferably the behavior data encompasses execution data like call graph, stack traces generated during execution of the service, name of the called function(s), type of input parameters, size of input parameters, value of input parameters, type of output parameters, size of output parameters, value of output parameters, the execution duration (of each function or of the whole service), the CPU execution time (duration) and the size of the allocated memory.

In a second embodiment, the behavior data may encompass environment data like the type or version of operating system of the computer machine on which the service is executed, the communication protocol used for incoming message(s), the communication protocol used for outgoing message(s), the execution time (i.e. timestamp or date) and the country where the entity is running.

In a third embodiment, the behavior data may encompass a combination of execution and environment data.

The nature of the spied (captured) data can be selected according to a security scheme or policy rules depending on the type of entity to protect or on the type of transaction. Preferably, the tracking agent is customized for its hosting entity.

Typically, the tracking agent starts monitoring the entity from the top level function called until its result becomes available. Each call to a function generates a response that is sent back to the caller. The tracking agent is able to detect that the execution is over in the service 21 and that it is the right time to compute the LSH hash.

The tracking agent is configured to generate a LSH hash H1 from its captured behavior data and to send the generated LSH hash H1 to the controller agent 14. Advantageously, an identifier of the current transaction (or the type of the transaction) is also transmitted to the controller agent 14 along with the LSH hash H1.

For instance, the tracking agent can send the LSH hash H1 to the controller agent 14 through Json over TLS.

Preferably, the sending of the LSH hash H1 is protected by usual cryptographic mechanisms (providing confidentiality and/or integrity) based on pre-provisioned keys. For instance, the tracking agent can encipher the LSH hash H1 using the public key of the controller agent.

It is to be noted that the LSH hash has a smaller size than the captured behavior data. Thus the bandwidth needed to send the message to the controller agent 14 is optimized. Similarly, the need for processor power is limited for cryptographic processes. Thus the tracking agent can easily be inserted in a software micro-service or an IoT device.

One action of the execution of the service 21 can be a call to another service (Ex: service 22) through a message M2. Then the sequence previously described for the service 21 for the tracking agent is run for the service 22. The service 22 includes a tracking agent (shown as a star) which is configured to capture behavior data reflecting the dynamic behavior of the service 22, to compute a LSH hash H2 from the captured behavior data and to send the LSH hash H2 to the controller agent 14.

Advantageously, the message M2 can comprise the transaction identifier which is then propagated to the controller agent. Thus the controller agent is aware that the several received LSH hashes belong to the same transaction. The transaction identifier can also allow to identify the transaction type so as to be able to target the relevant usage pattern when sending a query to the repository. In another embodiment, the transaction identifier can be propagated and managed via a queue mechanism.

The execution of the service 22 initiates a call to the next service 23 through a message M3. In turn, the service 23 start its own execution. Its tracking agent (shown as a star) is designed to capture the behavior data reflecting the dynamic behavior of the service 23, to compute a LSH hash H3 from the captured behavior data and to send the LSH hash H3 to the controller agent 14.

At this stage, the transaction is assumed to have been completed. For instance, the service 21 may check the validity of the bank account intended to receive the transfer, the service 22 may verify that the bank account to which the amount to be transferred will be deducted is sufficiently supplied and the service 23 may make the transfer. The service 24 may be designed to convert currencies. In the example of FIG. 1, the service 24 is not triggered since the transfer is performed in a single currency.

Preferably, the controller agent 14 can be configured to retrieve a reference LSH hash (or a list of reference LSH hashes) belonging to a usage pattern stored in the repository 18 as soon as it receives a LSH hash so that it can compute instantly (on-the-fly) a similarity score associated to the entity (service) involved in the transaction. Thus the controller agent can select and apply the selected preset security action before the end of the transaction.

The controller agent sends a message M5 to query the relevant usage pattern and receives the found reference LSH hash(es) (if any) via the message M6. These messages are repeated for each LSH hash coming from an entity involved in the transaction.

The query may contain the transaction type (or transaction identifier) and an identifier of the entity which generated the LSH hash from its behavior data.

Alternatively the controller agent may be configured to wait for all the LSH hashes of the current transaction before sending the message M5. In such a case, there is only one message M5 and only one message M6 that are sent.

It is to be noted that the orchestrator can manage several entities in parallel for one transaction. Thus the controller agent can handle several LSH hashes coming from parallel execution routes.

The repository 18 is a reference model that can be enriched in different ways. Preferably, the repository is initially populated with elements provided by a learning engine. For example, the system can be stimulated through a series of use cases aiming at characterizing the behavior of the components of the system. By observing clusters of system components (e.g. services) the learning engine can create usage patterns and store them into the repository. Preferably, the repository contains acceptable usage patterns corresponding to genuine transactions. Alternatively, it may also contain unacceptable usage patterns corresponding to unexpected (abnormal) transactions.

The repository (which can be built as a model) can be populated at a first stage then updated and enriched continuously or periodically as new services or applications become available or attack attempts are detected.

Preferably, the learning engine is a software component executed by a processor of a computer. It may be hosted in the Cloud for instance.

A tracking agent can be a software element intended to be executed by the processor of the computer hosting the entity. Alternatively, a tracking agent may be a hardware unit or a combination of hardware and firmware components.

FIG. 2 shows an example of a flow chart for securing the system 10 according to the invention.

The system 10 is the system of FIG. 1.

At step S20, a tracking agent of an entity, (e.g. service) involved in a transaction requested by a user, locally captures a behavior data that reflects the dynamic behavior of the entity.

At step S22, the tracking agent generates a LSH hash from the captured behavior data.

At step S24, based on both a reference LSH hash retrieved from the repository and the generated LSH hashes, the controller agent 14 computes a similarity score allocated to the entity and to the transaction.

At step S26, the controller agent 14 selects a preset security action based on the computed similarity score and applies it to the transaction. If no matching usage pattern or reference LSH hash is found in the repository, the controller agent 14 may apply a preset security action. In a learning phase, the controller agent 14 may also store the generated LSH hash(es) for later validation before populating the repository 18.

If the usage pattern comprises several reference LSH hashes allocated to an entity for a specific transaction type, the controller agent may retrieve the list of reference LSH hashes and compute as many similarity scores and check if at least one of the computed similarity scores is acceptable.

In one embodiment, the controller agent 14 may rely on an evaluation engine which has access to the content of the repository 18 and is designed to look for a usage pattern corresponding to the type of the ongoing transaction in order to identify the reference LSH hash. The evaluation engine can compute the similarity score and identify the security action associated with the found usage pattern or reference LSH hash.

Figure 3:
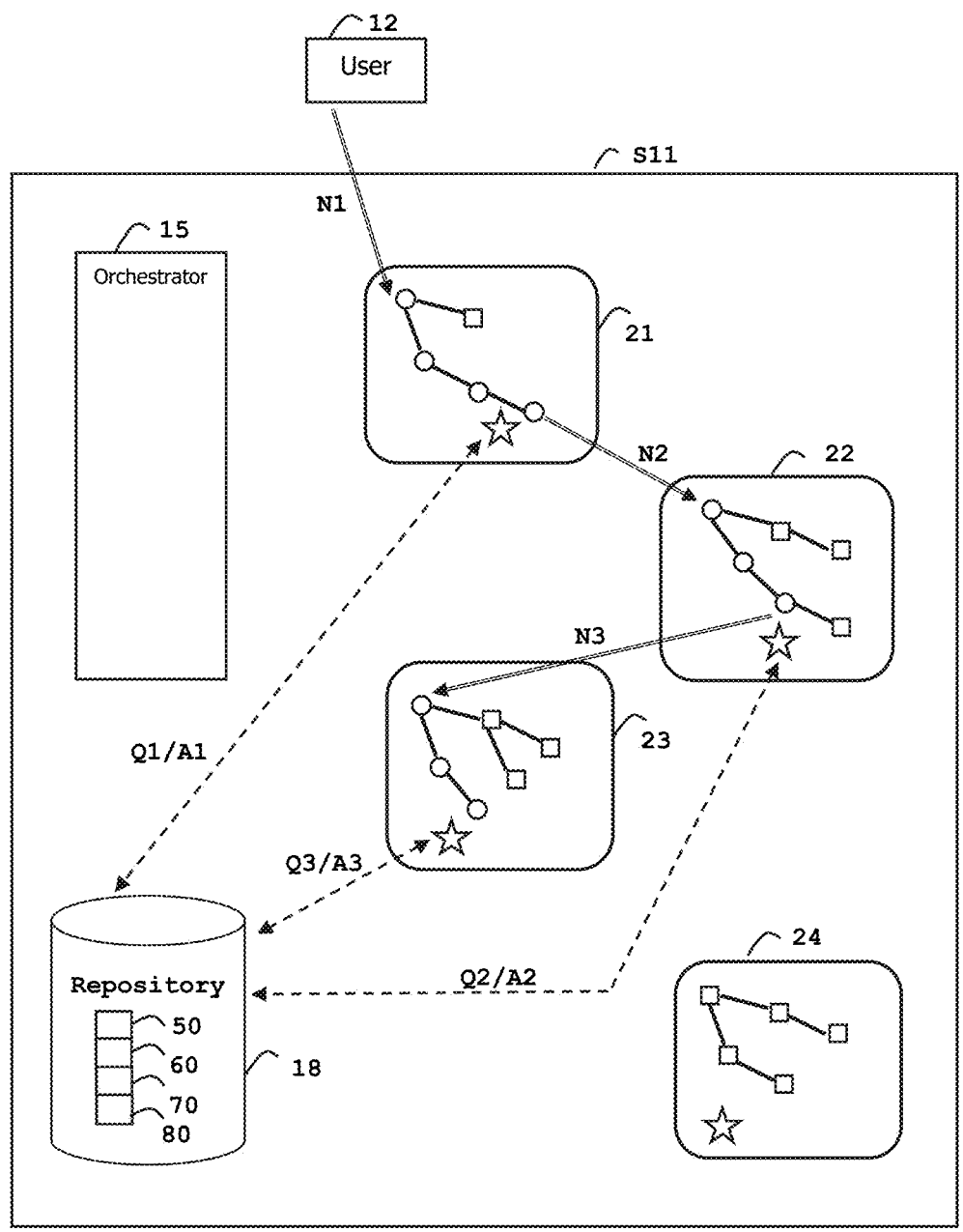
FIG. 3 is second example of architecture of a system according to the invention.

FIG. 3 shows a second example of architecture of a system according to the invention.

In this example, the system 11 is similar to the system 10 of FIG. 1 with a main difference regarding the implementation of the controller agent. Unlike the example of FIG. 1 in which a single controller agent centralizes the evaluation of computed LSH hashes, the role of the controller agent is distributed over the tracking agents of the entities.

In the example of FIG. 3, the orchestrator 15 is a conventional orchestrator.

The tracking agent of each entity (21-24) is configured to capture behavior data reflecting the own dynamic behavior of the entity and to generate a LSH hash from the captured behavior data.

In addition, the tracking agent of each entity (21-24) is configured to query the repository 18 for retrieving one or several reference LSH hash(es) and to compute a similarity score based on both the retrieved reference LSH hash(es) and the computed LSH hash. Each tracking agent is also designed to select a preset security action based on the computed similarity score and to apply the selected preset security action to the transaction.

In this example, the user 12 is an individual which makes a request to buy a video on a VOD site. The user sends (through a personal device like a tablet PC) a message N1 to the service 21 for triggering the transaction. Typically, the message N1 comprises the reference of the video and an identifier of the user.

Upon receipt of the message N1, execution of the service 21 starts by going through a series of function calls.

The service 21 includes a tracking agent (shown as a star) which is adapted to capture behavior data reflecting the dynamic behavior of the service 21. Preferably the behavior data encompasses execution data. The behavior data may also encompass environment data.

The tracking agent is configured to generate a LSH hash from its own captured behavior data.

The tracking agent is configured to retrieve at least one reference LSH hash from the repository 18 (via a query Q1 targeting a usage pattern and a response A1) and to compute a similarity score based on both the retrieved reference LSH hash and the computed LSH hash. Thus the tracking agent can select and directly apply a preset security action before the end of the transaction.

If the transaction is not blocked, the tracking agent can be configured to send the generated LSH hash H1 to the next service 22 through a message N2. Thus, the service 22 is able to check if the context in which it has been called is appropriate.

Preferably, the messages Q1/A1 are protected by usual cryptographic mechanisms (providing confidentiality and/or integrity) based on pre-provisioned keys.

The message N2 may comprise a LSH hash signature computed by the tracking agent of the service 21. Thus the tracking agent of the service 22 may check the genuineness of the received LSH hash.

The sequence continues in a similar way through each service involved in the transaction: the service captures its behavior data, generate a LSH hash, retrieves at least a reference LSH hash from the repository through a query response Q2/A2, computes a similarity score, selects and takes a security action and possibly sends a message N3 comprising its computed LSH hash to the service 23.

Similarly the service 23 captures its behavior data, generate a LSH hash, retrieves at least a reference LSH hash from the repository through a query response Q3/A3, computes a similarity score, selects and takes a security action.

At this stage, the transaction is assumed to have been completed. For instance, the service 21 may check the validity of the user identifier, the service 22 may verify that the targeted video is available and the service 23 may provide the user with an access token allowing to access the targeted video.

In another embodiment, a tracking agent can be configured to propagate both the LSH hash it computed and the received LSH hash(es) so that the next tracking agent can take all the chain of LSH hashes into account for selecting the security action.

The repository 18 may be distributed through the services 21-24 to decrease execution time and to separate liability for storing data.

It must be understood, within the scope of the invention, that the above-described embodiments are provided as non-limitative examples. In particular, the features described in the presented embodiments and examples may be combined.

Although systems of FIGS. 1 and 3 comprises a plurality of computer machines, the invention also applies to a system comprising a single computer machine.

The repository can store a great number of usage patterns related to a large number of types of transaction. The repository may be split in separate storage areas.

The invention allows to detect and prevent attacks occurring in highly distributed systems comprising a huge number of components (e.g. services).

The invention allows to take an appropriate security action during the execution of a transaction. For instance, it allows to continue execution of the transaction with fake components to fool the attacker.

The invention allows to secure a system comprising a huge number of components implemented using a large number of technologies, protocols, types of hardware device and programming languages.

It is to be noted that neither the LSH hash nor the repository (reference model) comprise sensitive data which may be used to retrieve the original transaction data. Privacy is therefore guaranteed.

The architecture of the systems shown at FIGS. 1 and 3 are provided as example only. These architectures may be different. For example, the security controller may be implemented as a full hardware component located in a computer server.

In the above presented embodiments, the system entities are software services. The invention can also apply to entities which are hardware devices or a combination of software components and hardware components.

The invention claimed is:

1. An enhanced system for detecting and countering attacks during execution of a transaction requested by a user, said system including a plurality of entities that are software services, software micro-services or hardware devices,
   wherein each of the entities involved in, and executing, said transaction requested by said user hosts its own tracking agent configured to:
   capture that entities own behavior data reflecting dynamic behavior of that entity during execution of said transaction,
   generate a set of locality-sensitive-hashing hashes from each of said behavior data, and
   send the set of locality-sensitive-hashing hashes to a controller agent over a secure communication channel;
   said system comprising:
   said tracking agent for each of the entities executing thereon;
   a repository that stores usage patterns and said controller agent, wherein each of said entities is configured to send its captured behavior data to the controller agent and wherein the controller agents is configured to:
   compute a similarity score for each of the entities involved in the transaction, based on both said usage patterns and the set of generated locality-sensitive-hashing hashes,
   select a preset security action based on a subset of the computed similarity scores, and
   apply said preset security action to the transaction to secure said executing of said transaction,
   wherein each of said behavior data reflects internal dynamic behavior of the entity that captured it and takes into account at least one item of the group comprising:
   internal call graph generated during execution of said entity,
   internal stack traces generated during execution of said entity,
   functions called internally during execution of said entity,
   type of output parameters of the functions called internally during execution of said entity,
   size of output parameters of the functions called internally during execution of said entity, and
   value of output parameters of the functions called internally during execution of said entity,
   wherein the tracking agent and controller agent are software components executing on a hardware processor of a computer communicating with or hosting the entity,
   wherein the controller agent is configured to compute a similarity score and to apply the preset security action,
   wherein the tracking agent is configured to propagate a locality-sensitivity hashing (LSH) hash it computed and received LSH hashes, such that a next tracking agent takes into account a chain of locality-sensitive-hashing hashes and send to the controller agent so that it is aware that the several received LSH hashes belong to a same transaction for selecting said preset security action,
   wherein each of said usage patterns in said chain comprises:
   a transaction type,
   a first entry which is allocated to one of said entities and which comprises a first reference locality-sensitive-hashing (LSH) hash for that entity, and
   at least one more entry which is allocated to one of said entities and which comprises at least one more reference (LSH) hash for that entity,
   wherein said tracking agent for that entity selects said preset security action based on a subset of the computed similarity scores from the first reference (LSH) hash and the at least one more reference (LSH) hash.

2. The system according to claim 1, wherein said preset action is at least one of the group comprising:
   letting the transaction run,
   blocking the transaction,
   deflecting execution of the transaction to legitimate-looking entities,
   sending an alert signal to a remote system,
   providing the user with a warning message, or
   logging a security alert.

3. The system according to claim 1, wherein said behavior data takes into account execution duration.

4. The system according to claim 1, wherein said behavior data takes into account at least one item of the group comprising:
   communication protocol used for incoming message,
   communication protocol used for outgoing message,
   execution time,
   country where the entity is running.

5. A computer-implemented method for detecting and countering attacks during execution of a transaction by a system including a plurality of entities that are software services, software micro-services or hardware devices, each hosting its own tracking agent, and a repository storing usage patterns, wherein the method performed on said at least one hardware processor comprises the following steps:
   by each of the tracking agents in entities involved in, and executing, said transaction requested by a user:
   capture that entities own behavior data reflecting dynamic behavior of that entity during said execution of said transaction,
   generate a set of locality-sensitive-hashing hashes from each of said behavior data for said transaction requested by said user, and
   send the set of locality-sensitive-hashing hashes to a controller agent over a secure communication channel; and
   by way of said controller agent:
   compute a similarity score for each of the entities involved in the transaction based on both said usage patterns and the set of generated locality-sensitive-hashing hashes,
   select a preset security action based on a subset of the computed similarity scores, and
   apply said preset security action to the transaction requested by said user to secure said executing of said transaction,
   wherein each of said behavior data reflects the internal dynamic behavior of the entity that captured it and takes into account at least one item of the group comprising:
   internal call graph generated during execution of said entity,
   internal stack traces generated during execution of said entity,
   functions called internally during execution of said entity,
   type of output parameters of the functions called internally during execution of said entity, size of output parameters of the functions called internally during execution of said entity, and value of output parameters of the functions called internally during execution of said entity, wherein the tracking agent and controller agent are software components executing on a hardware processor of a computer communicating with or hosting the entity, wherein the controller agent is configured to compute a similarity score and to apply the preset security action, wherein the tracking agent is configured to propagate a locality-sensitivity hashing (LSH) hash it computed and received LSH hashes, such that a next tracking agent takes into account a chain of locality-sensitive-hashing hashes and send to the controller agent so that it is aware that the several received LSH hashes belong to a same transaction for selecting said preset security action, wherein each of said usage patterns in said chain comprises:

a transaction type, a first entry which is allocated to one of said entities and which comprises a first reference locality-sensitive-hashing (LSH) hash for that entity, and at least one more entry which is allocated to one of said entities and which comprises at least one more reference (LSH) hash for that entity, wherein said tracking agent for that entity selects said preset security action based on a subset of the computed similarity scores from the first reference (LSH) hash and the at least one more reference (LSH) hash.

6. The method according to claim 5, wherein said preset action is at least one of the group comprising:

letting the transaction run, blocking the transaction, deflecting execution of the transaction to legitimate-looking entities, sending an alert signal to a remote system, providing the user with a warning message, or logging a security alert.

7. The method according to claim 5, wherein the system comprises a controller agent, wherein each of said entities sends its captured behavior data to the controller agent and wherein the controller agent computes said similarity scores and applies the preset security action.

8. The method according to claim 5, wherein the tracking agent of at least one of the entities involved in the transaction computes a similarity score and applies the preset security action, wherein the tracking agent is configured to propagate a chain of locality-sensitive-hashing hashes through a plurality of services executed for a transaction, such that a next tracking agent takes into account said chain of locality-sensitive-hashing hashes for selecting said preset security action.

9. The method according to claim 5, wherein said behavior data takes into account execution duration.

10. The method according to claim 5, wherein said behavior data takes into account at least one item of the group comprising:

communication protocol used for incoming message, communication protocol used for outgoing message, execution time, country where the entity is running.

* * * * *